Dec. 31, 1940.                L. BECK                 2,227,212
           LAMINATED MATERIAL AND METHOD OF MANUFACTURE
                       Filed July 23, 1938

INVENTOR
Leo Beck
BY
Alan N. Mann
his ATTORNEY

Patented Dec. 31, 1940

2,227,212

UNITED STATES PATENT OFFICE 2,227,212

LAMINATED MATERIAL AND METHOD OF MANUFACTURE

Leo Beck, Upper Montclair, N. J., assignor to Catalin Corporation, a corporation of Delaware Application July 23, 1938, Serial No. 220,931

5 Claims. (Cl. 154—2)

My invention relates to combining of materials with liquid resin adhesives and more particularly to method and means for controlling the penetration of thermosetting resin adhesives in the combined materials.

The use of liquid thermosetting resins as adhesives is becoming extensive. These liquid resins are used for laminating paper and the like where substantially the whole of each sheet is permeated and impregnated by the resin, and they are also used for laminating denser bodies such as wood veneers where the resin is applied simply to the faces of the respective layers without undue penetration. Another desirable use of these resins is for attaching a permeable body such as a fabric to an underbase without having the resin permeate through the fabric and yet under conditions where it is desired to have the resin permeate into the base material. This procedure involves certain difficulties such as the following:

When resins of this type are cured with heat under pressure the resin tends to permeate through the fabric or similar surface material and not only affects the appearance of the surface material but tends to stick to the press plates. On the other hand, if an adhesive is used that will not permeate through the surfacing layer, it most likely will not have sufficient penetrative power to effect an adequate bond with the underbody, which may be of any desired form of material, preferably sheeted, such as paper, batting, composition board, or wood. For example it may be desired to attach fabric to paper with cushioning material such as cotton batting between the two.

I have discovered that this bonding problem can be solved by proper association of a layer of certain thermoplastic material with the penetrative liquid thermosetting adhesive. More specifically, if a thin layer or sheet of thermoplastic material of a resinous nature is applied against the back of the fabric and if the thermoplastic material selected is one which will soften but not become fluid under the temperature and pressure conditions used, it will adhere firmly to the fabric without penetrating therethrough and at the same time will serve as a dam or blocking layer that prevents the underneath thermosetting resin from penetrating the fabric. Resinous materials of the type suited for use in this blocking sheet include the so-called vinyl resins, (ordinarily made from vinyl acetate or vinyl chloride or the like) the styrene resins, and the resins derived from acrylic acid, as well as bodies of a similar nature which perhaps are not true resins, such as cellulose acetate.

The penetrative liquid thermosetting resin that is used to effect an adequate bond between the surface material and the layers of base material is preferably of a phenol-formaldehyde resin or a urea-formaldehyde resin type. Many types of adhesives made from these resins are known in the art and their exact nature need not be described in detail. I have found it advantageous to use the type of resin described in the copending application Ser. No. 188,066 filed February 1, 1938, which has now issued as Patent No. 2,186,687, dated January 9, 1940. Under the action of heat and pressure, these aldehyde resins become quite fluid and permeate the backing material and then harden. In accordance with my invention the resin in this highly penetrative state is prevented, by means of the thermoplastic blocking sheet, from penetrating the fabric or other permeable surface material.

In using the blocking-sheet or film of thermoplastic resin as described above, I found that it was very difficult to make this layer of resin adhere to the adjacent coating of thermo-setting resin applied to the base material. The two resins being of a different type and nature were not mutually soluble as such and would not adhere to form the desired bond between the two resin layers. I found that this difficulty could be overcome however, by first blending with the thermosetting resin a relatively small amount of a thermoplastic resin before the thermosetting resin is applied to the base material adjacent the fabric. The blending of the two resins is obtained by the use of a mutual solvent or of compatible solvents so that a thorough mixture of the two resins is effected in liquid form. The resulting resin composition consisting of predominantly thermosetting resin with a minor amount of thermoplastic resin, will bond easily and rapidly with the sheet of thermoplastic resin interposed between it and the fabric.

The novel features of my invention are set forth with particularity in the appended claims. The invention itself, both as to organization and method of operation, will be easily understood from the following description taken in conjunction with the accompanying drawing, in which:

Figure 1:
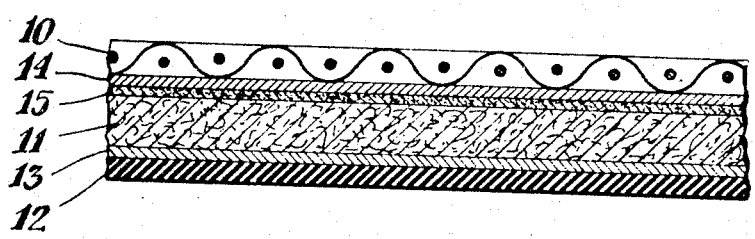
Fig. 1 is a sectional view of one form of my combined material.

Referring now to the drawing, and first to Fig.

1, it will be noted that the combined material comprises essentially a layer of fabric such as upholstery cloth 10, an intermediate layer of batting or other compressible material 11 and a sheet of rubberized or other strong paper 12. The paper is bonded to the intermediate batting by means of the thermosetting resin 13. The fabric 10 is bonded to the side of the batting opposite the paper 12 through the intermediary of a layer of thermoplastic resin 14 and an adjacent layer of composite thermosetting and thermoplastic resin 15. The layer of resin 13 may be the same type of composite resin as 15 or it may be entirely a thermosetting resin. In some instances the layer of resin 15 may be eliminated and the layer of resin 13 applied in sufficient amount to penetrate through the batting 11 and combine with the layer of thermoplastic resin 14. In that case the resin 13 must be of the composite form, described above, made by combining a relatively small amount of the thermoplastic resin with a predominant amount of the thermosetting resin, the resulting resin having the property of sticking and combining with the layer of thermoplastic resin 14 and also of penetrating the batting 11.

In combining the several sheets of material illustrated in Fig. 1 or similar materials by means of the above described layers of resin, the procedure may be carried out in the following manner:

The thermosetting resin which advantageously may be of the quick setting phenol-formaldehyde type disclosed in the above identified application, and to which is added about 10% thermoplastic resin, is applied to at least a portion of both sides of the cotton batting 11, or similar material which it is desired to form the inner part of the final combined product. The resin as applied is preferably in alcoholic solution and relatively thin. It may be applied to the batting by brushing, spraying, screening or other suitable means. I have found it advantageous to apply the resin by screening it onto the batting through a fine mesh silk screen; that is, by pouring the resin on the silk screen, placing the screen over the desired portion of the batting, and forcing the resin through the fine mesh of the screen by drawing a doctor blade over the resin in the conventional manner. This method provides a thin uniform film of the resin on the cotton batting. Where the resin is to be applied to the batting at spaced intervals, the screen may be divided into corresponding strips separated by the desired space through which no resin would pass.

After applying the resin to both sides of the batting 11 as described above, it is air dried at room temperature for sufficient time to expel most of the alcohol and leave a tacky coating of resin on either side of the batting and usually penetrating through the thickness of the batting. If quicker drying is desired, the batting with applied resin may be placed in an oven and heated sufficiently to expel the alcohol. This heating will not set up the thermosetting resin of the type disclosed in the above application so that the batting with applied adhesive film may be used immediately or its use delayed for a reasonable time as desired.

The batting with applied thermosetting resin film on either side is now assembled with the other materials for example, by placing the batting 11 over the sheet of strong paper 12, then covering the layer of resin 15 on top of the batting with a film or sheet of thermoplastic resin 14. This thermoplastic resin may be applied either as a brushed on or sprayed film, or in the form of a glue film, that is, a thin sheet of paper impregnated with the thermoplastic resin. I have found it advantageous to employ the thermoplastic resin in this latter form. The sheet of fabric such as upholstery cloth 10, is now laid on top of the sheet of thermoplastic resin 14 to complete the assembly. This assembly is placed in a press and heated under pressure for a sufficient time to effect the desired bonding of the several layers of material.

The thermosetting resin, which is used for bonding the paper, batting, cloth, etc. together, forms a very strong bond and also renders the bonded portion of the materials very dense and hard. This characteristic feature may be used to advantage in my invention to give the bonded material a decorative appearance and to permit bonding of the material at spaced intervals such as indicated in Fig. 2.

Figure 2:
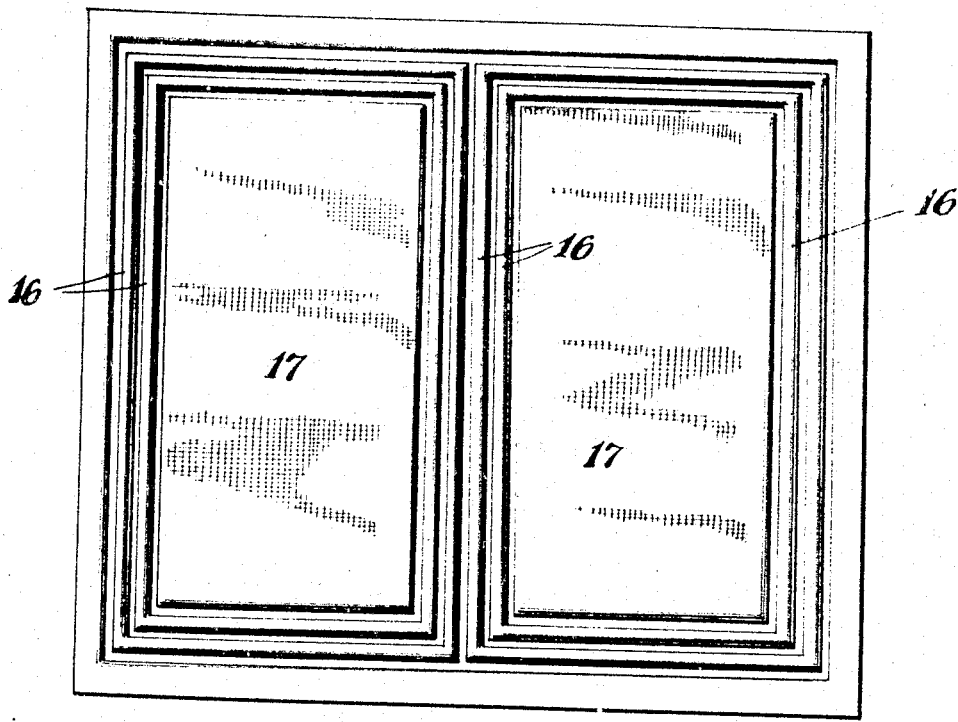
Fig. 2 is a plan view of the combined material illustrating a corrugated construction resulting from the bonding operation.

Referring now to Fig. 2 is will be noted that the combined material has a series of corrugations or ribs 16 along the portions where the adhesives have been applied and the several materials bonded together. This form of bonding gives a very strong anchorage between the several materials such that the bonding of the materials over their entire surface is not necessary, as illustrated at 17. The portions 17 in between the corrugated anchored portions 16 are soft and compressible and therefore offer substantial advantages as an upholstery material from the standpoint of appearance and comfort.

It is to be understood that any suitable thermoplastic type material that will become tacky upon the application of heat and pressure may be used for the blocking sheet between the surface and base materials. The principal requirement for the thermoplastic resins used for this purpose is that under the heat and pressure conditions employed, the resin will soften and become sufficiently tacky and adhesive to bond the cloth to the underlying layer of thermosetting resin but will not become sufficiently liquid to penetrate through the cloth to its outer surface and likewise will not permit the underlying layer of thermosetting resin to penetrate through it and the fabric sheet. Although the film or sheet of thermoplastic resin used has sufficient adhesive properties, when heated, to bond the outside fabric to the adjacent sheet of base material, while preventing the adjacent film of penetrative thermosetting resin from reaching the fabric, it will not penetrate through the adjacent base material and effect the desired bond between it and the other layers of base material. Therefore, the thermoplastic resin alone is not sufficient for the purposes of my invention. It serves primarily the purpose of preventing penetration of the thermosetting resin in one direction, the main bonding action being performed principally by the thermosetting resin.

In preparing the composite thermosetting and thermoplastic resin to be used as the bonding medium next to the thermoplastic resin as described above, the procedure may be varied widely. One example of a satisfactory composite resin consists of about 90%-95% of the phenol-formaldehyde resin in alcoholic solution described in the above application, and about 5%-10% of vinyl acetate resin. The vinyl acetate normally in the form of crystals is dissolved in the alcoholic solution of the phenol-formaldehyde resin by stirring with slight heat if necessary. When vinyl chloride is used in combination with the phenol-formaldehyde thermosetting resin the crystals may be added to the phenol-formaldehyde liquid resin in the manner mentioned just above, except that it is desirable in this instance to use acetone, instead of alcohol, as the common solvent for these two resins.

In accordance with one illustrative but non-limiting example of my invention, I have applied successfully the combining process described hereinabove to the manufacture of automobile upholstery material, known to the trade as "doors", using the following specific conditions and procedure:

To the alcoholic solution of liquid, thermosetting, phenol-formaldehyde resin (prepared according to the above-identified copending application) I added approximately 8% of vinyl acetate crystals based upon the weight of solid resin. The resulting mixture was screened in strips, as explained above, onto both sides of a sheet of cotton batting, each strip being about two inches wide and running for substantially the full length of the batting. The batting with applied adhesive was then dried in an oven at approximately 180° F. for two minutes to expel the alcohol and leave the applied resin tacky. The batting with tacky resin coating on each side was then placed on a sheet of rubberized paper and a thin sheet of paper impregnated with a vinyl acetate resin was placed over the other adhesive coated side of the batting. Finally a sheet of upholstery cloth was placed over the vinyl resin sheet to complete the assembly.

The above assembly was then placed between the two platens of a press, which were heated to approximately 350° F., the surface of the two platens being corrugated to give the combined material a ribbed or corrugated structure. The press was then closed and the above assembly heated between the two platens under a pressure of about 3000 pounds per square inch for approximately four seconds. This heat and pressure treatment causes the thermosetting resin to polymerize and bond the base materials together along the strips where the adhesive was applied to the batting, and causes the vinyl resin sheet to soften and effect a bond between the outside sheet of upholstery cloth and the adjacent film of thermosetting resin on the cotton batting. The corrugated surface of the platens forms a corresponding structure in the laminated assembly along the strips of adhesive.

The polymerized thermosetting resin gives the bends or corrugations in the combined material a very hard and strong construction. Because of this very strong and dense type of bond, it is not necessary to apply the adhesive over the entire surface of the laminated materials. In the regular upholstery panel or "door" the corrugated strips bonded with adhesive as above described may be confined to the border of the sheet leaving the enclosed laminated section unbonded.

Various modifications and changes may be made in the foregoing description without departing from the scope and spirit of this invention.

What I claim is:

1. A method of combining porous fabric with base materials comprising bonding said base materials with a penetrative liquid composite thermosetting and thermoplastic resin, and bonding said fabric to the base materials through the intermediary of a layer of thermoplastic resin located between the fabric and said composite thermosetting and thermoplastic resin, the thermoplastic resin preventing the composite thermosetting and thermoplastic resin from permeating the fabric, and said bonding being effected by the application of heat and pressure.

2. A method as specified in claim 1, in which the thermosetting resin is a resin selected from the group consisting of the phenol-formaldehyde and urea-formaldehyde resins and in which the thermoplastic resin is a vinyl resin.

3. A method of making a combined fibrous product from sheets of cloth, batting and paper comprising bonding the batting to the paper with a thermosetting resin by application of heat and pressure and bonding the cloth to the batting through the intermediary of a layer of thermoplastic resin and a contiguous layer of a composite thermoplastic and thermosetting resin between the thermoplastic resin and the batting, and said bonding being effected by the application of heat and pressure.

4. A composite laminated upholstery material comprising a resilient fibrous base material, a coating of infusible thermosetting resin with which is mixed a relatively small amount of thermoplastic resin on said fibrous material, a layer of thermoplastic resin superimposed on said thermosetting resin and a sheet of fabric superimposed on said thermoplastic resin, said fabric being firmly bonded to said resin coated fibrous material by said thermoplastic material which prevents permeation of said fabric by said thermosetting resin.

5. A composite laminated upholstery material comprising a resilient fibrous base material, a coating of infusible thermosetting resin on said fibrous material, a layer of thermoplastic resin superimposed on said thermosetting resin with an intervening layer of composite thermoplastic and thermosetting resin interposed between the layer of thermoplastic resin and said thermosetting resin and a sheet of fabric superimposed on said thermoplastic resin, said fabric being firmly bonded to said resin coated fibrous material by said thermoplastic material which prevents permeation of said fabric by said thermosetting resin.

LEO BECK.